United States Patent
Abebe et al.

(10) Patent No.: US 10,332,073 B2
(45) Date of Patent: Jun. 25, 2019

(54) AGILE TEAM STRUCTURE AND PROCESSES RECOMMENDATION

(71) Applicant: International Business Machines Corporation, Armonk, NY (US)

(72) Inventors: Ermyas Abebe, Altona (AU); Dileban Karunamoorthy, Carlton (AU); Cristian Vecchiola, Southbank (AU)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/259,793

(22) Filed: Sep. 8, 2016

(65) Prior Publication Data

US 2018/0068271 A1 Mar. 8, 2018

(51) Int. Cl.
| | |
|---|---|
| G06Q 10/06 | (2012.01) |
| G06Q 10/10 | (2012.01) |
| G06Q 50/00 | (2012.01) |
| G06F 9/44 | (2018.01) |

(52) U.S. Cl.
CPC ....... G06Q 10/103 (2013.01); G06Q 10/0639 (2013.01); G06Q 50/01 (2013.01)

(58) Field of Classification Search
CPC ... G06Q 10/103; G06Q 10/0639; G06Q 50/01
USPC .......................................................... 717/101
See application file for complete search history.

(56) References Cited

U.S. PATENT DOCUMENTS

| | | | | |
|---|---|---|---|---|
| 7,926,029 B1* | 4/2011 | Stoyen | ..... | G06F 8/20 706/11 |
| 2010/0262473 A1* | 10/2010 | Hughes | ..... | G06F 8/20 705/14.11 |
| 2012/0331439 A1* | 12/2012 | Zimmermann | ..... | G06F 11/3604 717/101 |
| 2013/0097583 A1* | 4/2013 | Kung | ..... | G06F 8/10 717/105 |

(Continued)

FOREIGN PATENT DOCUMENTS

JP 2015127929 A 7/2015

OTHER PUBLICATIONS

Yanagisawa, Hideaki, "Evaluation of a Web-based Programming Environment", IEEE, 2012, 6pg. (Year: 2012).*

(Continued)

*Primary Examiner* — Ryan D. Coyer
(74) *Attorney, Agent, or Firm* — Scully, Scott, Murphy & Presser, P.C.; Grant Johnson (57) ABSTRACT

Automatically learning and providing software development team structure and methodologies. A software development knowledgebase repository is generated by mining for software processes data over a network of computer systems. A team structure specification and project requirement associated with a target project is received. A software development methodology is selected from the software development knowledgebase repository based on the team structure specification and project requirement associated with a target project, a team members knowledgebase, a teams knowledgebase, and a past projects knowledgebase. A (Continued)

machine learning module automatically learns a software development methodology to select. Based on the software development methodology, a software development environment infrastructure for the target project is built.

18 Claims, 4 Drawing Sheets

(56) References Cited

U.S. PATENT DOCUMENTS

| | | | | |
|---|---|---|---|---|
| 2013/0167123 | A1* | 6/2013 | Dura | G06F 11/3624 717/127 |
| 2013/0297695 | A1* | 11/2013 | Satyanarayanan | H04L 65/403 709/204 |
| 2014/0282355 | A1 | 9/2014 | Berry et al. | |
| 2015/0082277 | A1* | 3/2015 | Champlin-Scharff | G06F 9/454 717/120 |
| 2016/0048805 | A1* | 2/2016 | Blincoe | G06Q 10/101 717/102 |

OTHER PUBLICATIONS

Scrum "What is Scrum?", https://www.scrum.org/Resources/What-is-Scrum, Printed on Sep. 8, 2016, 3 pages.
Scrum "Scrum Framework", https://www.scrum.org/Portals/0/Documents/Collateral/ScrumFramework_17×11.pdf, Printed on Sep. 8, 2016, 1 page.
Wikipedia, "Extreme Programming", https://en.wikipedia.org/wiki/Extreme_programming, Last modified on Sep. 1, 2016, Printed on Sep. 8, 2016, 11 pages.
Wikipedia, "Feature-driven Development", https://en.wikipedia.org/wiki/Feature-driven_development, Last modified on Sep. 2, 2016, Printed on Sep. 8, 2016, 13 pages.
Wikipedia, "Test-driven Development", https://en.wikipedia.org/wiki/Test-driven_development, Last modified on Sep. 8, 2016, Printed on Sep. 8, 2016, 14 pages.
Wikipedia, "Behavior-driven Development", https://en.wikipedia.org/wiki/Behavior-driven_development, Last modified on Sep. 3, 2016, Printed on Sep. 8, 2016, 10 pages.
Ambler, S.W., "Agile Scaling Model: Be as Agile as You Need to Be", https://www.agilealliance.org/wp-content/uploads/files/session_pdfs/Agile%20Scaling%20Model.pdf, Printed on Sep. 8, 2016, 31 pages.
Wikipedia, "Dynamic systems Development Method", https://en.wikipedia.org/wiki/Dynamic_systems_development_method, Last modified on Aug. 11, 2016, Printed on Sep. 8, 2016, 5 pages.
Alistair, "Crystal Methodologies", http://alistair.cockburn.us/Crystal+methodologies, Posted on Jun. 19, 2008, Last modified on Mar. 28, 2014, Printed on Sep. 8, 2016, 9 pages.
Atlassian "Comparing Workflows", https://www.atlassian.com/git/tutorials/comparing-workflows/centralized-workflow/, Printed on Sep. 8, 2016, 50 pages.
Gupta, S., "Comparison of Key Methodologies in AGILE", http://www.quotium.com/performance/comparison-of-key-methodologies-in-agile/, Printed on Aug. 9, 2016, 8 pages.
Piccoli, G., "Virtual teams: team control structure, work processes, and team effectiveness", Information Technology & People, Dec. 2004, pp. 359-379, vol. 17, No. 4.
Shelly, "Comparative Analysis of Different Agile Methodologies", International Journal of Computer Science and Information Technology Research, Jan.-Mar. 2015, pp. 199-203, vol. 3, Issue 1.

\* cited by examiner

AGILE TEAM STRUCTURE AND PROCESSES RECOMMENDATION

FIELD

The present application relates generally to computers and computer applications, and more particularly to machine learning and software development tools and methodologies.

BACKGROUND

Identifying ideal team composition and structure has bearing on efficiency and effectiveness of software project and any other type of projects that involves a group of people undertaking an activity. While this problem is challenging in general it becomes even worse in a context whereby agile methodologies are applied. In agile software development, requirements and solutions evolve through the collaborative effort of self-organizing cross-functional teams. Agile methodologies demand a considerable amount of collaboration and are designed to embrace change. This change might bring about different requirements which demand changes in team composition and structure. The optimality of a team composition and structure is determined by a myriad of factors including: skill levels of individuals, experiences of team members working together, personalities, code styles and life styles (specifically in geographically dispersed teams). The current methodologies or approaches rely primarily on the judgment of team leads and project managers during the setup phase and on measurements of past performance and while adapting workload as the project progresses. Those approaches fail to account for all relevant factors, leading to sub-optimal team composition and inefficiencies in project outcomes.

BRIEF SUMMARY

A method and system of automatically learning and providing software development team structure and methodologies may be provided. The method, in one aspect, may include generating a software development knowledgebase repository comprising software development methodologies by mining for software processes data over a network of computer systems. The method may also include receiving a team structure specification and project requirement associated with a target project. The method may further include selecting a software development methodology from the software development knowledgebase repository based on the team structure specification and project requirement associated with a target project, a team members knowledgebase, a teams knowledgebase, and a past projects knowledgebase, wherein the software development methodology to select is automatically learned by a machine learning module. The method may also include, based on the software development methodology, building a software development environment infrastructure for the target project, the building the software development environment infrastructure comprising at least creating a virtual machine and a software development version control system on the virtual machine.

A system of automatically learning and providing software development team structure and methodologies, in one aspect, may include at least one hardware processor communicatively coupled over a communication network to a plurality of computer systems. A storage device may be coupled to the at least one hardware processor. The at least one hardware processor may generate a software development knowledgebase repository comprising software development methodologies by mining for software processes data from the plurality of computer systems over the communication network. The at least one hardware processor may store software development knowledgebase repository on the storage device. The at least one hardware processor may receive a team structure specification and project requirement associated with a target project. The at least one hardware processor may select a software development methodology from the software development knowledgebase repository based on the team structure specification and project requirement associated with a target project, a team members knowledgebase, a teams knowledgebase, and a past projects knowledgebase, wherein the software development methodology to select is automatically learned by a machine learning module. Based on the software development methodology, the at least one hardware processor may build a software development environment infrastructure for the target project. The building of the software development environment infrastructure may include at least creating a virtual machine and a software development version control system on the virtual machine.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method may be presented that trains a computer to automatically determine optimal team structures and provide tuning suggestions for related processes, for example, based on: 1) mined information about individuals including skills, career goals, and social profiles; 2) team dynamics inferred from past interaction and personalities from individuals; 3) project metadata including requirements and technical details.

Figure 1:
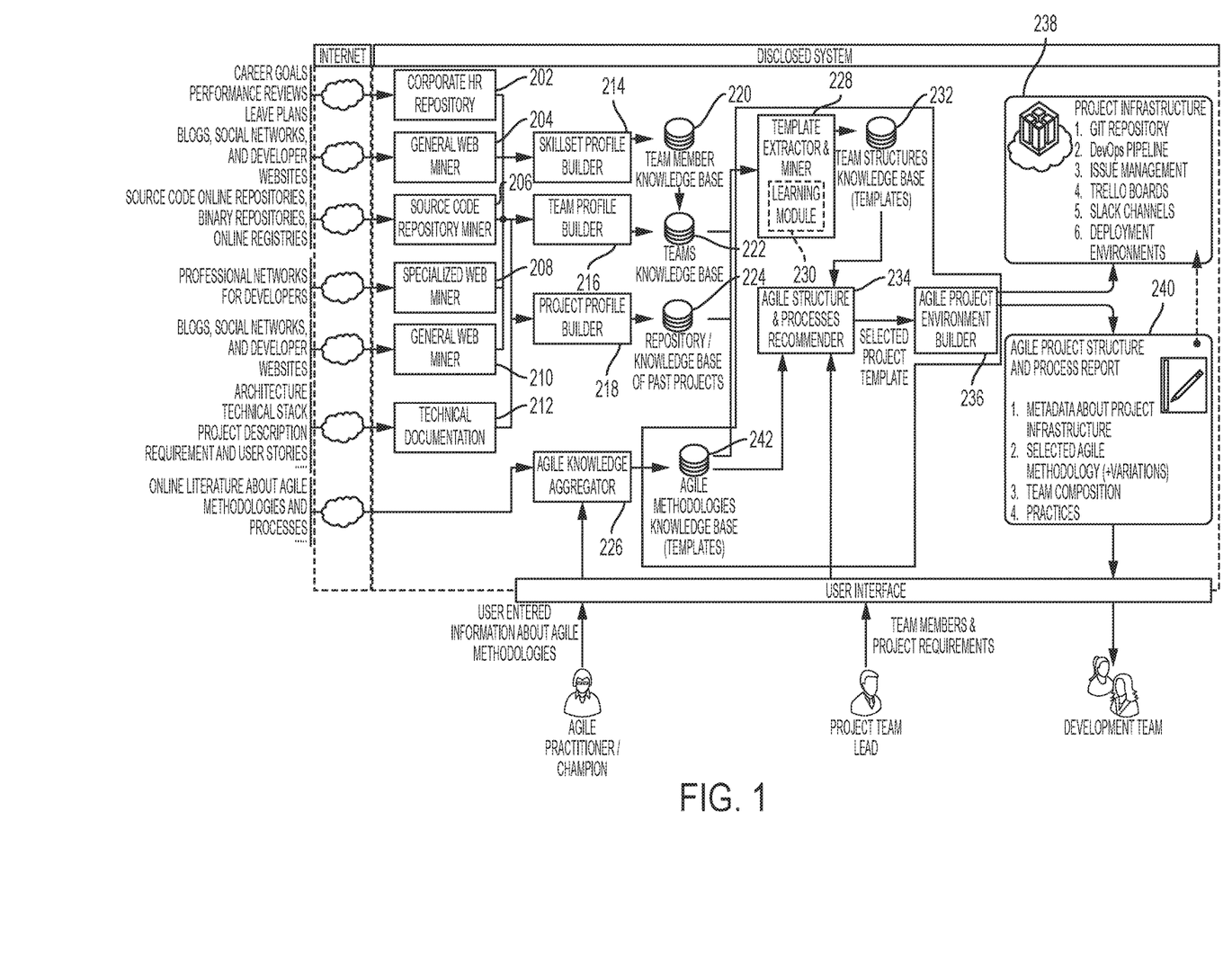
FIG. 1 is a diagram showing system architecture in one embodiment of the present disclosure.

FIG. 1 is a diagram illustrating components of a system in one embodiment of the present disclosure. The components may execute or run on at least one hardware processor. The system, in one aspect, may include a skillset profile builder 214, a team profile builder 216, and a project profile builder 218 that builds a repository of past projects 224. The repository of past projects 224 may be constructed based on information such as architecture, technical stack, project description, requirements and user stories, stored in technical documentation 212. The system may receive or retrieve information from a plurality of sources including source code repositories (with access to codebase, commit history), a knowledgebase containing history of interaction between individuals (e.g., slack, Trello, issue trackers), social networks and community websites (e.g., social networking web server or site, micro blogging web server or site, video talks, and the like), and human resources (HR) database 202 that includes user career goals, performance review, and planned leave.

A source code repository miner 206 may mine source code information from a web server or databases that store source code and associated data. A specialized web miner 208 may mine data from special repositories. A general web miner 204, 210 may search and mine web site, for example, that are publicly available.

Referring to FIG. 1, a corporate HR repository 202 may store or include user data such as user career goals, performance review, and planned leave. A general web miner 204, may extract data from sources such as blogs, forums, social media, and/or others, and implement or apply various natural language processing (NLP) techniques such as topic modeling, sentiment analysis, and/or other, to identify profile information about team members.

A source repository extractor or miner 206 may mine public and private source code repositories (e.g., GitHub, Gitlab, Sourceforge, TopCoder, and/or others) for software that a person has authored or collaborated-on, and infers, e.g.: software components that a developer is familiar with (programming languages, libraries, frameworks, tools, and/or others); the proficiency, skill level and coding style of the developer.

A specialized web miner 208 may mine data from special repositories, for example, extract and analyze data from a curated list of known sites that contain structured profile information about skills and capabilities. For instance, a profile of a person from a professional social network site may contain both the listing of technology skills a person is familiar with as well as endorsements a person has received from peers around each of those technologies. Other sources of similar information may include career websites, curriculum vitae (CV) of a person, and/or other web sites and/or sources. A developer's profile may be extracted from these information sources. In one aspect, public web application programming interfaces (APIs) of these services may be executed to fetch this type of information, and/or scrape data from these sources.

A general web miner 210 may search and mine web sites, for example, that are publicly available, for example, mine data from generic sources such as social media, blogs, articles, and/or others, authored by a user. Technical documentation 212 may include mined data such as software and system architecture, technical stack, project description, requirements and user stories.

Information may be mined from various sources over the Internet. Various natural language processing (NLP) techniques may be used or implemented to this end, such as entity extraction, topic modeling, sentiment analysis, and/or others.

Profile builder components, including the skillset profile builder 214, team profile builder 216 and project profile builder 218 analyze data mined from a number of data sources. The skillset profile builder 214 generates a team member knowledgebase 220. The team profile builder 216 generates teams knowledgebase 222. The project profile builder 218 generates a repository or knowledgebase of past projects 224.

An agile knowledge aggregator 226 mines and analyzes online literature about agile methodologies and processes and builds an agile methodologies knowledge base, for example, comprising templates. The information that the agile knowledge aggregator 226 mines may also come from a user entered information about agile methodologies, for example, an agile practitioner.

A template extractor and miner 228 may include a learning module 230, and may select templates from the agile methodologies knowledge base 242 and adjust the templates based on information learned from team member knowledge base 220, teams knowledge base 222 and knowledgebase of past projects 224, for a target project. The template extractor and miner 228 may build a team structure knowledgebase 232, which may include the adjusted templates specific to target projects.

The knowledgebase of past projects (224) contains types of information that are relevant to the template extractor and miner 228 and the learning module 230. The types of information include project metadata, project artifacts, and project assessment.

The project metadata is a collection of basic information about the project such us project identifier, project title, project description, customer and domain. The metadata can be represented by a collection of attributes $<M_1, \ldots M_n>$. Project title, project description, customer, and domain are an example of the type of metadata stored. The list may include additional attribute that are used for the purpose of describing and accounting for a project.

The project artifacts are the artifacts that have been used within the project to support its operation. The following are examples of project artifacts:

Git Workflows: a specific set of rules on how to manage source code repository content with branches and their use in the promotion of code from development to release as well as in the bug (software malfunctions) fixing. Examples of Git workflows may include Centralized Workflow, Feature Branch Workflow, Gitflow Workflow, Fork Workflow. One or more variations of a Git workflow can be implemented. Git Workflows may be codified as a set of rules and references to source repositories from the perspective of the data structure being produced by the component.

SCRUM Frequency and Timing: this type of output records, for instance, the cadence of the scrum (e.g., daily, weekly, bi-weekly) and the time of the day with duration. Project Division: a breakdown of the project team with an identification of roles for each member of the team.

DevOps Pipeline: a description of the development operations infrastructure that is used to support the project life-cycle. For instance, it may contain: the number of software repositories to be used, the mapping of the components to the corresponding repositories, skeletons or boilerplates that already provide integration with various plugins for testing, source code analysis, building tasks, and target deployment environments.

Program Pairs and Code Reviews: this type of information refers to whether pair programming techniques and code reviews were used, and which specific type of pairs were adopted (for instance, team member $T_A$ playing role A in the project paired with team member $T_B$ playing role B in the project).

Team Building Activities: a record of the suggested activities for the team (e.g., lunches, after-work or week-end activities, social engagements).

Any agile process or tool used (if used): "Sprint Burndown Charts", "Epic Burndown Charts", "Cumulative Flow Diagram", "Project Velocity Graph", "Retrospectives".

This list is provided as an example, and this attribute may include additional agile artifact known and/or adopted in the agile practice.

Information about these artifacts can be persisted (or stored) as a tuple $<A_1, \ldots A_n>$ associated with the project. The project artifact tuple may include additional artifacts that are used to support the execution of a project.

The project assessment contains information about the project outcome. This information can be attached to the project in the form of post-project completion questionnaire. An example of this questionnaire may include, but not limited to, the following:

Q1. Was the project successful? [Yes/No/Partially]
Q2. Was the project delivered in time? [Yes/No]
Q3. Was the customer excited/disappointed/ . . . ? [choose one]
Q4. Did the team enjoy working in the project? [Yes/No/Partially]
Q5. What was liked and not liked? [open answer]
Q6. Which practice was key for this type of project? [open answer]

Answers to questions Q1 to Q6 constitute a tuple $<Q1, \ldots Qn>$ that is stored with the project metadata. The set of questions identified above is an example of possible questions, the tuple may also include other questions considered of relevance for a project assessment.

The combination of the types of information (e.g., project metadata, project artifacts, and project assessment) constitutes a project record $<<M_1, \ldots, M_n>, <A_1, \ldots, A_n>, <Q_1, \ldots Q_n>>$ that is used by the miner 228 and the learning module 230 together with other components to infer and adjust team structure templates. In an embodiment, as the data changes in the depending knowledge bases (e.g., a project completes and the questionnaire is entered, or a new team member profile is built and stored in the team member knowledgebase 220, or new information about a team is updated in the corresponding knowledgebase 222), the miner 228 is notified and the new information is assessed to determine whether a new team template needs to be added to the knowledgebase 232 and/or existing templates need to be updated. In another embodiment, the template extractor and miner 228 and the learning module 230 can be executed at scheduled interval to improve knowledgebase 232.

The knowledge base of team profile members 220 is a repository that is constantly updated with the capability and skills of each person within the organization that has been involved in projects within a capacity and a role. It provides the capability of providing a view on the aggregated skillset of the team member and/or a view over time of the set of skills and roles that the team member has acquired. This component is used to inform the content of the teams' knowledgebase 222.

The teams knowledgebase 222 contains record of all the team combinations that have worked together. In particular, let T be a tuple of such knowledgebase, the teams knowledgebase 222 may contain the following information: project identifier (Pid); the list of team members with the corresponding roles played in that team; the period of time the team has been active (working together).

The project identifier can be used to map the team to the corresponding project in the knowledgebase of past projects 224. Useful information that can be queried from this knowledgebase may include, for instance:

how many times a particular configuration of roles has been used in projects?
which configuration worked best for a given project type?
how many times two (or more) individuals have worked together?
did two people ever work together?

This information may be extracted by correlating the records in this knowledgebase 222 with the content of the knowledgebase of past projects 224 via the project identifier. Other techniques for correlating the two knowledgebases can be used (e.g., machine learning and natural language processing).

In the scenario where the template extractor and miner 228 receives an update from one of the knowledgebases, the template extractor and miner 228 may:

Inspect the nature of the change (which knowledge base has changed?); and
Identify based on the nature of the change the action to take to update the team structure knowledge base 232.

The different actions depend upon the specific knowledgebase being updated. For an update to the team member profile knowledge base (220) no direct action may be taken. For an update to the team knowledge base (222) the template extractor and miner 228 may review the update and update the team structure 232. An example of the operation that can be carried out by the template extractor and miner 228 may include the following: a new record gets inserted in the knowledgebase 222 and the miner extracts the pattern of roles associated with the record (e.g., one architect, one web developer, 2 testers) and correlates this record with the project knowledgebase 224 to identify the project and lookup the assessment. The positive outcome of the project is checked and if the outcome is positive and there exist multiple instances of this pattern in the knowledgebase a template is either created in the knowledge base 232. If such template is already existing, the template is assigned a higher score for the given project type. This information is captured by the learning module 230 as well as part of the learning process. For an update of the past projects knowledgebase 224, the information about the new project (or the availability of its assessment) can be used to revise the team structures, for instance, by increasing the scoring of a specific team structure or updating it for that specific type of project. In one embodiment the template extractor and miner 228 may access the retrospectives associated with the project and, for example, through a natural language processing technique, identify aspects of the project such as "co-location", "remote teams", "daily scrums" and associate a positive/negative sentiment to it, which can in turn be used to alter the score of a team structure or modify such structure, if these findings reinforce the previous findings from past similar projects.

In one embodiment, the skillset profile builder 214 creates and maintains profile for each individual accessible within the system. The agile team recommender 234 may extract the following information: requirements, technology stack (e.g., platforms, languages and libraries), architecture or reference designs, and deployment targets. The team profile builder 216 inspects the history of interactions between individuals to identify familiarity across individuals, commonality and disparity of practices and style, personality profiles and compatibility, geography and work pattern. The agile team recommender 234 identifies team structure and processes by identifying the right frequencies of scrums based on the characteristics of the team and the length of iterations and by identifying the sub-team composition and structure for each specific tasks to be executed (e.g., pairing, code-reviews) based on career goals or performance reviews, skillset profile, interaction history, and/or others. Frequency of scrums refers to the cadence with which scrums are run. Briefly, a scrum is an iterative and incremental agile software development framework for managing product development, a methodology for handling complex projects that falls within the agile practices. Within this methodology it is conceived that project team members will gather together on a daily basis (i.e., "Daily Scrums") to discuss about the tasks to be acted upon and current obstacles to problems. The daily cadence of scrums is effective when there are project team members that are fully trained, educated, and proficient in the scrum method or have embraced the agile practices. In one embodiment of the present disclosure, to compose a team from a heterogeneous set of people who may have different habits, goals, work practices, the parameter (frequency of scrums) is identified and adapted for the best outcome of the team.

In one embodiment, tasks may be prioritized based on requirements by taking into account: known planned leave and critical paths, skill level and others.

The structure recommender and the process recommender 234 may maintain a knowledgebase of agile team structures 232, agile methodologies 242 (e.g., eXtreme Programming (XP), Feature-driven Development (FDD), Test Driven Development (TDD), Behaviour Driven Development (BDD), Agile Scaling Mode (ASM), Dynamic Systems Development Method (DSDM), Crystal (a family of agile methodologies), scrums), development practices, and Development Operations(DevOps) (e.g., application development and system operations) processes and their advantages and disadvantages. The repository of agile methodologies (242) is essentially built out from the existing and available information in the literature about processes and methodologies in the agile word, through the agile knowledge aggregator 226, which can also include human input. The knowledgebase of agile team structures 232 is the component that is built and improved over time by the learning module 230. In one embodiment, this information can be initially entered manually and harvested from the literature. Over time, the learning module 230 enriches knowledgebase 232, with an increasing corpus of projects being analyzed within and/or across organizations.

The structure and process recommender 234 may maintain a template of team structures and processes annotated with information about the qualities of each template 232 (e.g., works well for skill disparate small teams co-located in a geographical location). A template may include: 1. the selected agile methodology as baseline for the team; 2. identification of roles and which developer profile could better perform that role (at this point, the profile is not an actual profile, but a reference one based on skillset); 3. DevOps supporting infrastructure and organization (e.g., repository structure for source code and artifacts, git flow (or like code development flow), commit practice, continuous delivery/continuous integration); 4. team activities (team lunches, team challenges, and other activities not directly related to the development).

The templates can be organized into a hierarchical structure having at the top (e.g., root of the structure), for example, the templates that may be used for each of the agile methodologies known to the system. The templates in one embodiment may be derived by the existing literature about agile methodologies and comparison between them.

The structure and process recommender 234 may maintain individual and team profiles. This information may be fed or received from the team profile builder 216 and skillset profile builder 214. Template may be automatically built from mining a corpus of past projects and measuring efficacy across a number of factors and manual annotated data about the best practices, recommended approaches advantages, disadvantages and limitations of various approaches. Machine learning techniques such as clustering across multiple variables may be implemented. In one embodiment, a system of the present disclosure may mine and/or identify: 1. the profiles of teams in past projects; 2. the project meta-data; 3. agile team progress metrics (sprint/epic burndown charts, issues/defects reported, cumulative flow diagram, milestones, and/or others) to evaluate the efficacy of team structures and processes under those scenarios. For each process, a means of measuring the process may be implemented.

In one embodiment, information about the efficacy of practices for given situations that are already known may be used to bootstrap the system. In this embodiment, the following assumptions may be considered. The organization is agile, which implies that metadata about the past project in the form of "Retrospectives", "Sprint Burndown Charts", "Epic Burndown Charts", "Cumulative Flow Diagram", may be available. Retrospective may be used in performing text analytics to infer lessons learnt. Other agile charts may provide information on effectives of the current layout of the project, applied practices and methodologies. The methodology of the present disclosure may keep track of the project, for example, tasks management systems may be used to keep track of the project, for example, bugs or errors, feature development and code review. The methodology of the present disclosure in one embodiment may use the history of bugs in a project as an indication of the effectiveness of the team. Time allocated to code review, discovered based on keeping track of code review, can be used to identify disparity of skills in the team.

As projects are executed and operations of the projects progress, the learning module 230 learns about the past project history and team members with their skills. The learning module 230 in collaboration with the template extractor and miner 228 may create new templates as variations from the existing templates based on projects or procedures in the projects found to be successful, for example, in a threshold number of cases.

Learning module 230 is a component that uses historical data of projects, teams and agile project templates to infer which template structure worked well for different team and project profiles. To do this the component in one embodiment uses several historical data points about projects and teams, extracted from the knowledge base components 222, 224 and 242.

Specifically, given a Project $P_1$, a team $T_1$ that worked on project $P_1$, and an Agile Team Structure $S_1$ used by $T_1$ for $P_1$, the component may determine how productive $T_1$ was on $P_1$ given the structure $S_1$. For $P_1$, the component retrieves a number of feature vectors $<p_1, p_2, p_3, p_4 \ldots p_n>$ about $P_1$, which includes normalized productivity indicators about a project such as sprint burn-down data, bug report frequency, commit frequency, code review durations and a number of other metrics, which are readily available from the repository of a project (and associated tools such as task management tools). The component may also retrieve information about $T_1$ as a feature vector $<t_1, t_2, t_3, t_4 \ldots t_n>$, which includes normalized data about a team such as the size of teams, degree of proficiency in project technology, and/or others. The component first computes a team productivity score $Q_1$ based on the attributes of $P_1$. In one embodiment $Q_1$ may be computed using a weighted average of the normalized scores of the attributes of $P_1$ as below.

$$\sum_{i=1}^{n} w_i a_i$$

Once an efficacy score $Q_1$ is computed, the component builds a feature vector made up of the feature vector of a team profile (or subset thereof), the efficacy score and the agile team structure $S_1$ as follows $<Q_1, S_1, <t_1, t_2, t_3, t_4 \ldots t_n>>$. In one embodiment, this feature vector along with feature vectors for all other historical projects in the repository, may be fed into an unsupervised learning technique such as a hierarchical clustering technique to determine the correlation of the features of a team profile with the project efficacy output. This may then be used by the Agile Structure and Process Recommender 234, to estimate the efficacy of a given Structure S, for a specified team profile T.

Consider as an example that Project A produced customer satisfaction and delivery on time. Based on this information, the methodology of the present disclosure in one embodiment may use Project A as reference for structuring the teams and assigning roles for another project that has similar requirements Agile structure and processes recommender 234 may receive as input target team members and project requirements associated with a target project. Agile structure and processes recommender 234, based on the templates stored in the agile methodologies knowledgebase 242 and team structures knowledgebase 232 may select a project template for the received target team members and project requirements associated with a project. The agile structure and process recommender 234 may be triggered by the user that provides details about the new project requirements. For instance, details such as the following may be entered: Project time frame; Customer and domain; Customer location; Project deliverable (what needs to be built).

This information can be used to first identify the project template of reference in the knowledgebase 232. In one embodiment, the knowledge base 232 can contain attributes in the form of tags that can be used to mix-and-match the current requirements along with the previously discussed efficacy score. In other embodiments, more sophisticated searches can be performed. Once the project template is identified, the template contains a collection of project artifacts that will support the operations of project including, for instance: reference agile methodology used within the project as recorded in the knowledgebase 242; changes to the process of the reference methodology in terms of, for instance, length of iterations, whether to apply extreme programming practices, frequency of the retrospectives; organization and structure of the repositories; reference technical stack; supporting development operations infrastructure; git workflow; list of roles that compose the team; deployment infrastructure.

The information about the list of roles that compose the team can be used to mine the knowledgebases of team members 220 and the teams 222 to identify possibly the individuals that can be selected to compose the team. Information in past project knowledgebase 224 may be extracted to check whether there are previous projects with the same customer or in the same domain that had a successful outcome and to track back the individuals that previously worked with the same customers effectively. In providing suggestions about the specific set of people composing the team, the agile structure and processes recommender 234 can identify whether there are successful recurrent combinations of individuals that match the combination of required roles and therefore prefer those to others. Artifacts such as Project Division, DevOps Pipeline, Program Pairs and Code Review and Team Building Activities may then used to inform the agile project environment builder 236.

The following illustrates another example scenario. A team of 6 people in Company X have been tasked with creating a proof of concept application using Blockchain for a financial services firm. They have 2 months to build the system.

The profile builder components, for example, including the skillset profile builder 214, team profile builder 216 and project profile builder 218 analyze data mined from a number of data sources (e.g., 202, 204, 206, 208, 210, 212) and may determine that: there exists team members that have created proof of concepts using XYZ Blockchain previously; one member actively contributes to the XYZ Blockchain core platform; most of the team is familiar with scrum and XP methodologies; most of the team is co-located, but 2 members of the team are geographically located in a region with a 3 hour time zone difference to the rest of the team; the team that is located remotely has a different corporate DevOps pipeline and is not familiar with some of the tools and processes of the rest of the team; some members of the team have positive experiences working together; two members of the team are identified as being technical leaders; a couple of the team members have a record of not working well together; one member of the team has a strong finance background and experience working on a different project in the specific use-case; project profile component identifies the requirements of the system; identifies the sub components in the architecture of the system and the technology and skill requirements, for example, determines the technology stack of the implementation platform (XYZ Blockchain) and determines in addition to the person 2 other team members have skills working on a similar technology stack to the platform, determines the security requirements for the project and identifies two members of the team have experience working on similar security requirements; some members have different work routines, coming and leaving early to and from work, and others preferring to come later in the day and working until late.

Structure and process recommender 234 may provide the following recommendations based on the above-example mined data. Scrum agile methodology is chosen for the project because: 1) short project deadline requires shorter sprint cycles; 2) scrum enables high level of team communication which is important in this project because the team has diverse skill sets, have not worked together before and because the project's deadline is short; 3) a majority of the team is familiar with Scrum. For effective communication of all teams, a daily scrum standup meeting that accounts for the work time preferences and time zones is recommended in this example. A daily meeting is scheduled to compensate for the fact that scrum yields poor documentation. Due to data and source code export control regulation constraints the system in this example recommends using the DevOps pipeline that is provisioned in the client's geographic region, which is the same geographic region as the location of the majority of the team. One team member is identified as having had past experience leading Proof of Concept(s) (PoCs) with the client, and has technical experience in the platform. Moreover, his personality profile identifies him as an influencer and hence he is chosen to be a technical leader and scrum master. Sub teams are created based on a matching of the project component requirements and the skillsets of individuals while also accounting for the relationships and personalities of individuals. System notices a gap in people's skills and allocated roles and suggests learning modules and schedules.

A project environment builder 236 in one embodiment executing on at least one hardware processor may setup DevOps pipeline, setup daily scrum meetings, and retrospectives accordingly, set up learning group agenda and meetings.

In one embodiment, once a template has been selected the system of the present disclosure sets up the necessary environment for the project based on chosen configurations, for example, by interacting over the network with a number of external systems, and creates a DevOps environment based on chosen practice and team structure (e.g., Agile practice and team structure). For example, the system interacts with enterprise databases and systems to retrieve information about team members, interact with external DevOps and communication/collaboration tools, services and application programming interfaces (APIs) to communicate over the network and automatically create and/or configure DevOps environments. For example, the system may create version control system (e.g., Git) repositories and add team members, create continuous integration jobs, configure communication tools (e.g., slack, Gitter), create and configure issue management and code review configurations. The system may configure processes and workflows for code review and deployment approvals based on the chosen team structure (e.g., Agile team structure). The system may setup deployment environment, for example, provision new virtual machines (VMs) and databases as required. For instance, the system may communicate with cloud provisioning services to transacting with such systems to configure the VMs and databases. The system may also schedule relevant events in team calendars, e.g., standup meetings, sprints timelines, retrospectives, by interacting with enterprise mail and calendaring systems.

Agile project environment builder 236 receives the selected project template and builds a project infrastructure 238 for the target project. The project infrastructure 238 may include a version control system repository, DevOps pipeline, issue management, Trello Boards, Slack Channels, and development environment. The project environment builder 236 uses the information contained in the template selected by the agile structure and process recommender 234, for example, Project Division, DevOps Pipeline, Program Pairs and Code Reviews, and Team Building Activities. Moreover, the information about the roles and the identified list of people are used to set up the related and giving access to the selected team members. The agile project environment builder 236 also generates a project structure and process report 240 that may include metadata about project infrastructures, selected agile methodology and/or variables, team composition and practices. The report may be generated on a user interface, for example, accessible to the team members.

Such creation of DevOps environment and/or changes effected by the creation of DevOps may be presented to a user via a user interface. For example, a user interface may display or show a visual representation of the setup process and progress of the above activities, visual representation of the team structure and DevOps environment that has been setup, via a graphical user interface (GUI), updates on calendar systems, instant message notifications, and other media.

Figure 2:
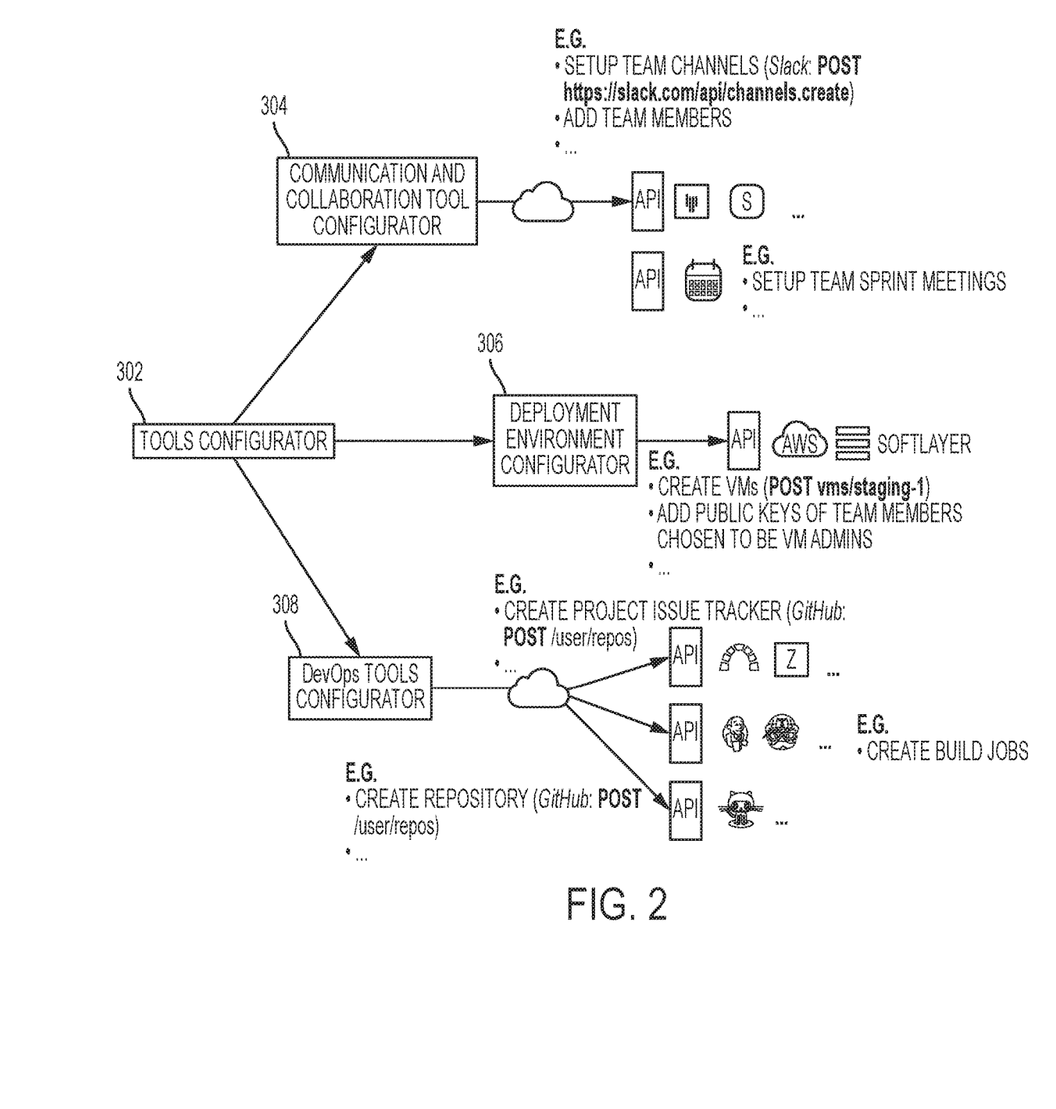
FIG. 2 is a diagram illustrating an embodiment of components of the agile project environment builder.

FIG. 2 is a diagram illustrating an embodiment of components of the agile project environment builder, for example shown in FIG. 1 at 236. The tools configurator 302 coordinates the actions of the three other components: communications and collaboration tools configurator 304; development environment configurator 306; and DevOps tools configurator 308.

The communication and collaborator tools configurator 304, takes the list of team members and provides them with access to the selected communication services, these may be tools such as Slack for team communication and Trello for task management. In case the selected template has identified the use of Slack as a communication tools, the following operation may be executed:

1. If the organization is already on Slack and does have a team registered with the service, one or more channels are created with an appropriate name to map them to their use (conventions that can be encoded programmatically can be used).

2. The selected team members are invited to the relevant channels and a set of topics is defined for each of the channel.

3. If there exist specific restrictions on the project access a new team can be created for the management of the project. This acts as a completely separate entity from the organization team, in which channels are created and team members invited to.

The operations described above can be implemented within a computer program as services such as Slack provide a full set of APIs to programmatically control and manage the service.

In the case Trello has been selected as a tool for task management a new collection of boards are created to manage the project and team members are invited to it. Such operations can be executed programmatically through the APIs exposed by the service. Tools for communication and task management may be used that provide their services through APIs. The communication and collaboration tool configurator 304 may be composed by a collection of modules (plug-ins) that taken a list of team members (e.g., identifier by email) sets up the service, thus making this component extensible to other tools and services that may be identified in the future.

Based on the identified agile methodology in the template and the variations applied to it, the communication and collaboration tool configurator 304 also may update the calendar of each team member with the appropriate team meetings and events (e.g., iteration review meeting, daily SCRUMs, team building activities, team lunches).

The DevOps tools configurator 308 configures the development operations toolchain including source control, builds services and sets them up to support the software development life-cycle in the chosen development stack. A template includes the organization and structure of the repositories identified for the project. An example scenario may include the following: if the template identifies a reference stack based on JAVA for building a collection of Representational State Transfer (REST) APIs, the template may also identify a two repositories for the source code of the project one for the REST APIs and one for the entities that are exposed through these APIs. The DevOps tool configurator 308 may then create, for instance, two git repositories and populates them with the reference boilerplates for each of the two modules with integration to the build services of choices. If the agile structure and process recommender has identified that the team of selected people is more familiar with Maven as dependency and build management system, the boilerplates may include the appropriate set of Maven plugins to execute the build process and produce the software artifacts. With regard to the build services, several options may be available, for example, the process of configuring the build process for Travis. A similar approach applies to Jenkins, Bamboo, CircleCI, GoCD, and/or others. The service is then configured to build the repositories configured for the project. For Travis, a private/travis folder and a .travis.yml files are inserted into the corresponding repositories to be built and their content is configured according to the requirements identified in the template for building the application in the language/platform of choice. A virtual machine can be created to execute the build that is configured with an installation of all the tools and libraries required to build the software.

The development environment configurator 306, based on the information identified in the project template, may select the appropriate infrastructure, for test, build, and deployment. An example maybe the selection of SoftLayer™, Amazon Elastic Compute Cloud (EC2)™, or Windows™ Azure™ or any other available Cloud Computing providers registered with the configurator 306, which may suit the constraints identified in the project template. For example, in the scenario identified above, for deployment infrastructure (where the software application built is to eventually reside), the .travis.yml file may be enriched with information and credential required to deploy the application in the target platform.

Figure 3:
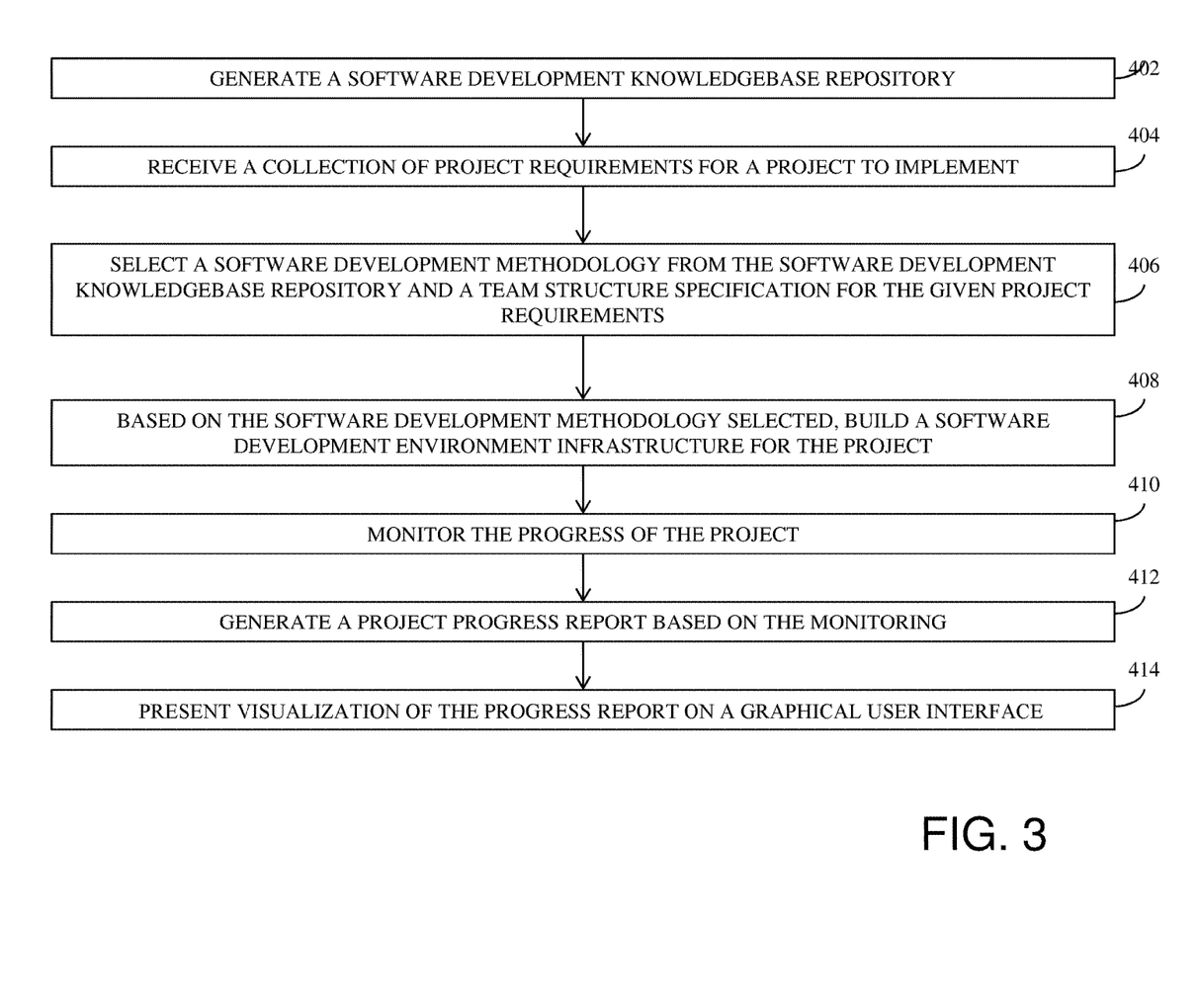
FIG. 3 is a flow diagram illustrating a method of the present disclosure in one embodiment.

FIG. 3 is a flow diagram illustrating a method of the present disclosure in one embodiment. The method in one embodiment is executed by at least one hardware processor. The method may automatically learn and provide software development team structure and methodologies. The method in one embodiment is performed by at least one hardware processor. At 402, a software development knowledgebase repository is generated, for example, by mining for software processes data over a network of computer systems, for example, the Internet or another network of computers. The software development knowledge repository may include 220, 222, 224 and 242 shown in FIG. 1.

At 404, a team structure specification and project requirement associated with a target project may be received. For example, a collection of project requirements may be provided to the system.

At 406, a software development methodology is selected from the software development knowledgebase repository based on the project requirement and the corresponding team structure specification for a target project. For example, this task may be performed by interrogating the team structure knowledgebase 232, which is updated by the template extractor and miner 228 and the learning module 230 shown in FIG. 1. The team structure specification is used by the agile structure and process recommender 234 to provide a specific instance of the team that may execute the project. This may be done, for example, by interrogating the software development knowledgebase repository composed by 220, 222, 224, and 242.

In one embodiment, the team members knowledgebase is generated based on mining a plurality of social network web sites over an internet and an enterprise repository comprising skillset data. In one embodiment, the teams knowledgebase is generated based on mining a plurality of social network web sites over an internet and an enterprise repository comprising skillset data. In one embodiment, the past projects knowledgebase is generated based on mining over the network of computer systems data associated with architecture technical stack and project descriptions.

At 408, based on the software development methodology selected, a software development environment infrastructure for the target project is built. The building the software development environment infrastructure includes at least creating a virtual machine and a software development version control system on the virtual machine. The building of the software development environment infrastructure further may include creating a devops tool comprising at least a project issue tracker executing on the virtual machine.

At 410, the progress of the target project being implemented via the virtual machine and the software development version control system is monitored. At 412, based on the monitoring, a project progress report may be generated. At 414, the project progress report may be visualized on a computer graphical user interface.

Figure 4:
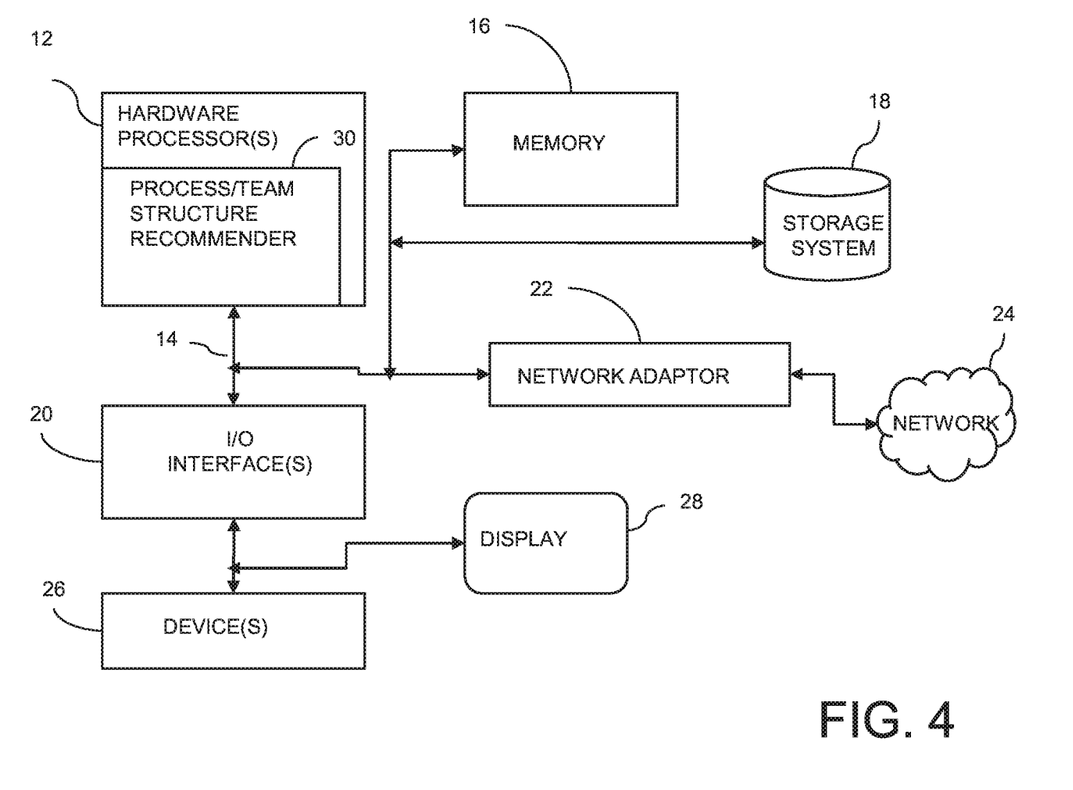
FIG. 4 illustrates a schematic of an example computer or processing system that may implement a team structure and process recommendation learning system in one embodiment of the present disclosure.

FIG. 4 illustrates a schematic of an example computer or processing system that may implement a team structure and process recommendation learning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of automatically learning and providing software development team structure and methodologies, the method performed by at least one hardware processor, the method comprising:

generating a software development knowledgebase repository comprising software development methodologies by mining for software processes data over a network of computer systems;

receiving a team structure specification and project requirement associated with a target project;

selecting a software development methodology from the software development knowledgebase repository based on the team structure specification and project requirement, a team members knowledgebase, a teams knowledgebase, and a past projects knowledgebase, wherein the software development methodology to select is automatically learned by a machine learning module; and based on the software development methodology, building a software development environment infrastructure for the target project, the building the software development environment infrastructure comprising interacting with application programming interfaces (APIs) to communicate over a computer network and automatically configure DevOps environment, the building the software development environment infrastructure further comprising at least creating a virtual machine and a software development version control system on the virtual machine, wherein executing the virtual machine builds software development environment infrastructure.

2. The method of claim 1, further comprising:

monitoring progress of the target project, which is being implemented via the virtual machine and the software development version control system;

based on the monitoring, creating a project progress report; and visualizing the project progress report on a computer graphical user interface.

3. The method of claim 1, wherein the team members knowledgebase is generated based on mining a plurality of social network web sites over an internet and an enterprise repository comprising skillset data.

4. The method of claim 1, wherein the teams knowledgebase is generated based on mining a plurality of social network web sites over an internet and an enterprise repository comprising skillset data.

5. The method of claim 1, wherein the past projects knowledgebase is generated based on mining over the network of computer systems data associated with architecture technical stack and project descriptions.

6. The method of claim 1, wherein the building the software development environment infrastructure further comprises creating a devops tool comprising at least a project issue tracker executing on the virtual machine.

7. A computer readable storage medium storing a program of instructions executable by a machine to perform a method of automatically learning and providing software development team structure and methodologies, the method comprising:

generating a software development knowledgebase repository comprising software development methodologies by mining for software processes data over a network of computer systems;

receiving a team structure specification and project requirement associated with a target project;

selecting a software development methodology from the software development knowledgebase repository based on the team structure specification and project requirement, a team members knowledgebase, a teams knowledgebase, and a past projects knowledgebase, wherein the software development methodology to select is automatically learned by a machine learning module; and based on the software development methodology, building a software development environment infrastructure for the target project, the building the software development environment infrastructure comprising interacting with application programming interfaces (APIs) to communicate over a computer network and automatically configure DevOps environment, the building the software development environment infrastructure further comprising at least creating a virtual machine and a software development version control system on the virtual machine, wherein executing the virtual machine builds software development environment infrastructure.

8. The computer readable storage medium of claim 7, further comprising:

monitoring progress of the target project, which is being implemented via the virtual machine and the software development version control system;

based on the monitoring, creating a project progress report; and visualizing the project progress report on a computer graphical user interface.

9. The computer readable storage medium of claim 7, wherein the team members knowledgebase is generated based on mining a plurality of social network web sites over an internet and an enterprise repository comprising skillset data.

10. The computer readable storage medium of claim 7, wherein the teams knowledgebase is generated based on mining a plurality of social network web sites over an internet and an enterprise repository comprising skillset data.

11. The computer readable storage medium of claim 7, wherein the past projects knowledgebase is generated based on mining over the network of computer systems data associated with architecture technical stack and project descriptions.

12. The computer readable storage medium of claim 7, wherein the building the software development environment infrastructure further comprises creating a devops tool comprising at least a project issue tracker executing on the virtual machine.

13. A system of automatically learning and providing software development team structure and methodologies, comprising:

at least one hardware processor communicatively coupled over a communication network to a plurality of computer systems;

a storage devices coupled to the at least one hardware processor;

the at least one hardware processor generating a software development knowledgebase repository comprising software development methodologies by mining for software processes data from the plurality of computer systems over the communication network;

the at least one hardware processor storing software development knowledgebase repository on the storage device;

the at least one hardware processor receiving a team structure specification and project requirement associated with a target project;

the at least one hardware processor selecting a software development methodology from the software development knowledgebase repository based on the team structure specification and project requirement, a team members knowledgebase, a teams knowledgebase, and a past projects knowledgebase, wherein the software development methodology to select is automatically learned by a machine learning module; and based on the software development methodology, the at least one hardware processor building a software development environment infrastructure for the target project, the building the software development environment infrastructure comprising interacting with application programming interfaces (APIs) to communicate over a computer network and automatically configure DevOps environment, the building the software development environment infrastructure further comprising at least creating a virtual machine and a software development version control system on the virtual machine, wherein executing the virtual machine builds software development environment infrastructure.

14. The system of claim 13, wherein the at least one hardware processor monitors progress of the target project, which being implemented via the virtual machine and the software development version control system, the at least one hardware processor, based on the monitoring, creating a project progress report, the at least one hardware processor visualizing the project progress report on a computer graphical user interface.

15. The system of claim 13, wherein the team members knowledgebase is generated based on mining a plurality of social network web sites over an internet and an enterprise repository comprising skillset data.

16. The system of claim 13, wherein the teams knowledgebase is generated based on mining a plurality of social network web sites over an internet and an enterprise repository comprising skillset data.

17. The system of claim 13, wherein the past projects knowledgebase is generated based on mining over the network of computer systems data associated with architecture technical stack and project descriptions.

18. The system of claim 13, wherein the at least one hardware processor creates a devops tool comprising at least a project issue tracker executing on the virtual machine in building the software development environment infrastructure.

* * * * *